United States Patent [19]
Jones

[11] 3,780,884
[45] Dec. 25, 1973

[54] ARTICLE TRANSFER DEVICE

[75] Inventor: Robert Keith Jones, Salt Lake City, Utah

[73] Assignee: Kenway Engineering, Incorporated, Woods Cross, Utah

[22] Filed: Apr. 3, 1972

[21] Appl. No.: 240,565

[52] U.S. Cl. ............................... 214/8.5 D, 214/89
[51] Int. Cl. ............................................. B65g 59/04
[58] Field of Search ................. 214/89, 6 DS, 8.5 C, 214/8.5 D, 6 H

[56] References Cited
UNITED STATES PATENTS
| | | | |
|---|---|---|---|
| 3,206,041 | 9/1965 | McGrath | 214/8.5 D |
| 3,409,149 | 11/1968 | Graux | 214/8.5 D |
| 3,682,469 | 8/1972 | Itoh | 214/89 X |
| 3,517,835 | 6/1970 | Temple | 214/8.5 D |

FOREIGN PATENTS OR APPLICATIONS
| | | | |
|---|---|---|---|
| 969,527 | 9/1964 | Great Britain | 214/6 H |

Primary Examiner—Albert J. Makay
Attorney—Lynn G. Foster

[57] ABSTRACT

An article transfer device comprising a first conveyor, a platform positioned to permit transfer of articles between said platform and said first conveyor, a vacuum manifold mounted above said platform, a plurality of vacuum cups depending from said manifold and each having a bore communicating the gripping surface thereof with said manifold, elevating means for raising and lowering said platform into and out of a position to cause articles carried by said platform to engage at least one of said vacuum cups, a shuttle extendable to a position underlying said vacuum cups and retractable to a position removed from said vacuum cups, and a second conveyor positioned to permit transfer of articles between said shuttle and said second conveyor.

2 Claims, 3 Drawing Figures

ARTICLE TRANSFER DEVICE

BACKGROUND

1. Field of Invention

This invention relates to material handling apparatus and is particularly directed to means for loading and unloading articles, such as cartons, onto and off of pallets.

In the material handling art, it is customary to load a plurality of cartons onto a pallet to permit handling as a unit by fork lift trucks, conveyors, and the like. However, it is frequently necessary or desirable to transfer all or some of these cartons from one pallet to another. For example, several different sizes of cartons may be loaded on a single pallet and, subsequently, it may be desirable to segregate the various sizes onto respective pallets.

2. Prior Art

Historically, such transfer has been accomplished manually. However, hand labor is always time consuming, expensive, and tiresome. Accordingly, numerous devices have been proposed heretofore for accomplishing such transfers mechanically. Unfortunately, none of the prior art devices have been entirely satisfactory. Some of the prior art carton handling devices have operated clumsily and have tended to drop or crush the cartons. Other prior art devices have been bulky, complex, and expensive, and have required considerably maintenance. Still other prior art devices have been capable of accommodating only cartons and tiers of a given size. Additional prior art devices have been capable of either loading or unloading cartons, but have been incapable of performing both operations.

BRIEF SUMMARY AND OBJECTS OF INVENTION

These disadvantages of the prior art are overcome with the present invention and a carton transfer device is disclosed which is simple, compact, and inexpensive, yet is capable of both loading and unloading cartons of substantially any desired size and density. Moreover, the device of the present invention does not require that the cartons be presented to it in a precise orientation or number, and performs the transfer quickly and efficiently without danger of dropping or crushing the cartons.

The advantages of the present invention are preferably attained by providing a carton transfer device comprising a first conveyor, a platform positioned to permit transfer of cartons between said platform and said first conveyor, a vacuum manifold mounted above said platform, a plurality of vacuum cups depending from said manifold and each having a bore communicating the gripping surface of a respective vacuum cup with said manifold, said bores being dimensioned such that engagement of any one or more of said vacuum cups with a carton will enable said one or more cups to produce sufficient vacuum to retain said carton, elevating means for raising and lowering said platform into and out of a position to cause cartons carried by said platform to engage said vacuum cups, a shuttle extendable to a position underlying said vacuum cups and retractable to a position removed from said vacuum cups, and a second conveyor positioned to permit transfer of cartons between said shuttle and said second conveyor.

Accordingly, it is an object of the present invention to provide improved article transfer means.

Another object of the present invention is to provide means for transferring cartons between first and second positions.

A further object of the present invention is to provide an article transfer device which is simple, compact, and inexpensive.

An additional object of the present invention is to provide an article transfer device which is capable of accepting as few as one carton.

An additional object of the present invention is to provide an article transfer device which is capable of both loading and unloading cartons of substantially any desired size.

Another object of the present invention is to provide an article transfer device which is capable of accepting cartons which are not precisely oriented.

A specific object of the present invention is to provide an article transfer device comprising a first conveyor, a platform positioned to permit transfer of cartons between said platform and said first conveyor, a vacuum manifold mounted above said platform, a plurality of vacuum cups depending from said manifold and each having a bore communicating the gripping surface of a respective vacuum cup with said manifold, said bores being dimensioned such that engagement of any one or more of said vacuum cups with a carton will enable said one or more cups to produce sufficient vacuum to retain said carton, elevating means for raising and lowering said platform into and out of a position to cause cartons carried by said platform to engage said vacuum cups, a shuttle extendable to a position underlying said vacuum cups and retractable to a position removed from said vacuum cups, and a second conveyor positioned to permit transfer of cartons between said shuttle and said second conveyor.

These and other objects and features of the present invention will be apparent from the following detailed description, taken with reference to the accompanying drawings.

DETAILED DESCRIPTION OF ILLUSTRATED EMBODIMENT

Figure 1:
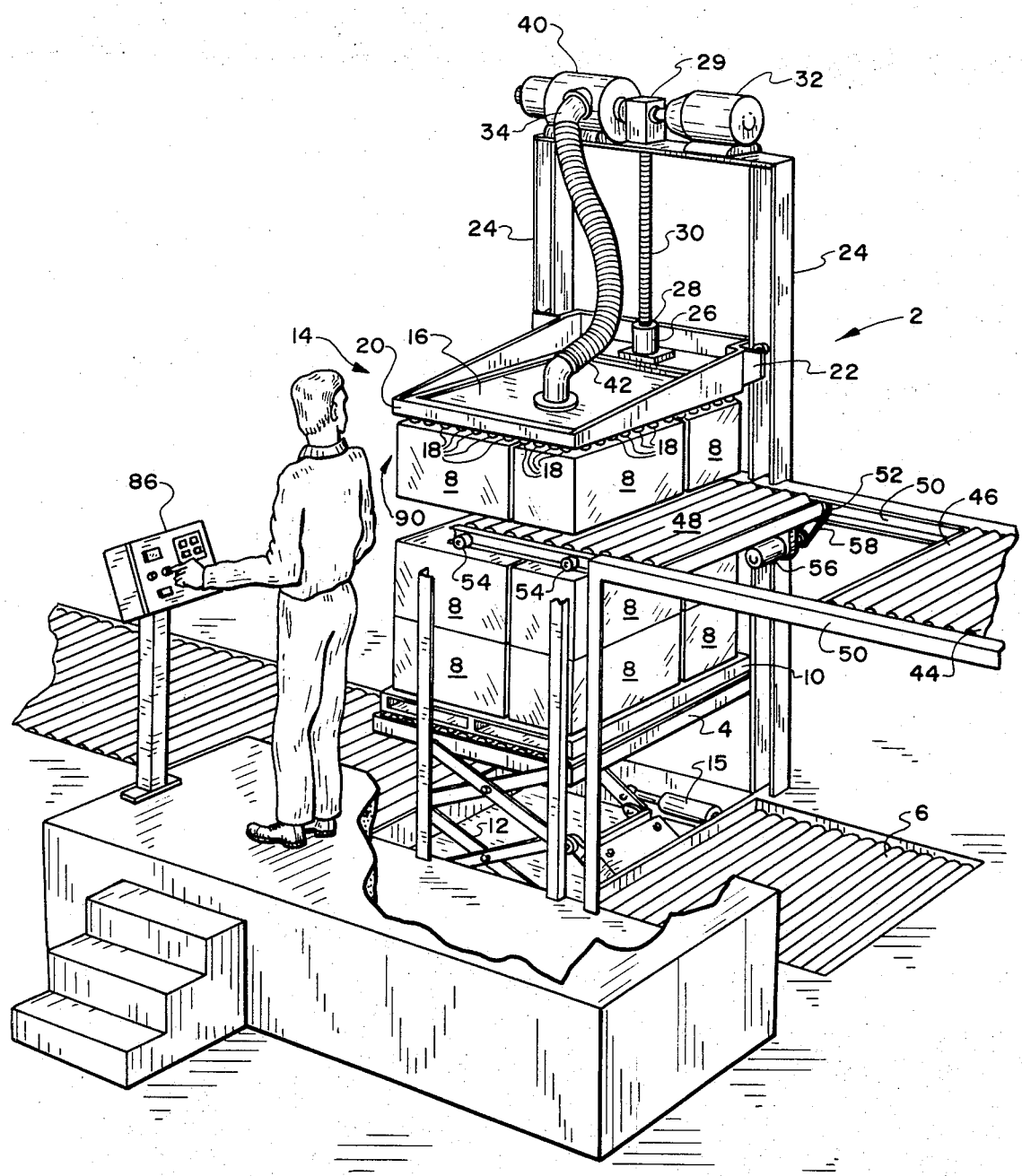
FIG. 1 is an isometric view of an article transfer device embodying the present invention.
Figure 2:
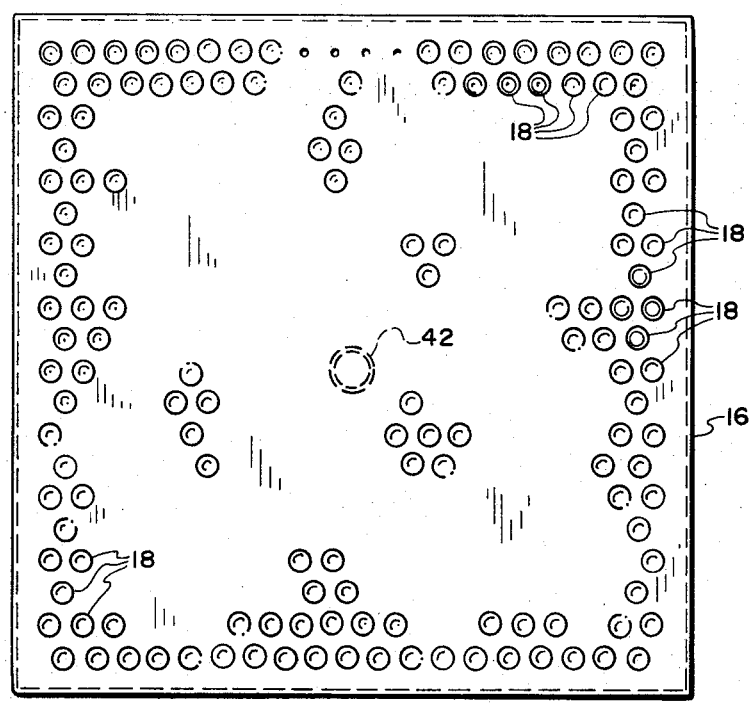
FIG. 2 is a bottom plan view of the gripping unit of the device of FIG. 1.

In that form of the present invention chosen for purposes of illustration, FIG. 1 shows an article handling device, indicated generally at 2, having a platform 4 and a first conveyor 6 positioned to permit articles, such as cartons 8 carried by a pallet 10, to be moved from the first conveyor 6 onto the platform 4 or from the platform 4 onto the fist conveyor 6. A scissor-type jack 12 driven by a fluid motor 15, or the like, is connected to the platform 4 and is operable to raise and lower the platform 4. A gripping unit, indicated generally at 14, is disposed, in spaced relation, above the platform 4 and comprises a vacuum manifold 16 having a plurality of vacuum cups 18 depending therefrom, as best seen in FIG. 2. The manifold 16 is preferably mounted within a frame 20 in a manner such as to permit limited vertical movement of the manifold 16 relative to the frame 20. The frame 20 is provided with outwardly projecting flanges 22 which slidably embrace vertical guide members 24. In addition, the frame 20 carries a bracket 26 having an internally threaded opening 28 which mates with a worm 30 driven, through transmission 29, by a motor 32 mounted on cross-member 34 carried by the upper ends of the guide members 24. Thus, motor 32 is operable to adjust the vertical position of the frame 20. A vacuum pump 40 is coupled, by hose 42, to create a vacuum within the manifold 16. A second conveyor 44 has one end 46 positioned adjacent the device 2 at a vertical location between the frame 20 and the lowered position of the platform 4, and a shuttle 48 is provided adjacent end 46 of the second conveyor 44. The shuttle 48 is extendable below the frame 30 to a position overlying the platform 4 and is retractable to a position engaging end 46 of the second conveyor 44 to permit cartons to be transferred from the shuttle 48 to the second conveyor 44 or vice versa. The shuttle 48 comprises a pair of generally U-shaped tracks 50 which project from end 46 of the second conveyor 44 and a shuttle platform 52 which is supported for movement along the tracks 50 by wheels 54. A second motor 56 is mounted under the shuttle platform 52 and is coupled by chain drive 58, or the like, to drive the shuttle 48 between its extended and retracted positions.

Figure 3:
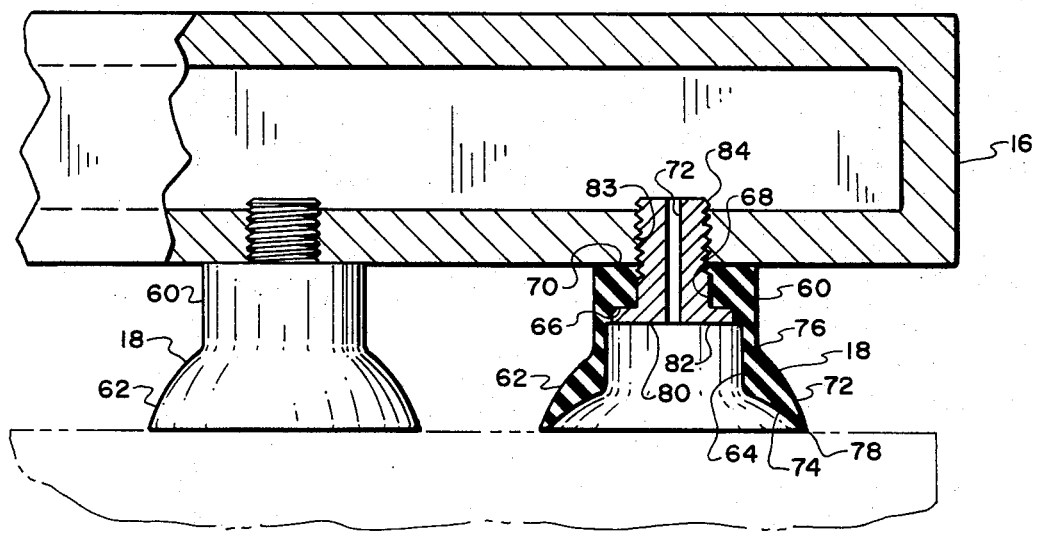
FIG. 3 is a vertical section through one of the vacuum cups of the device of FIG. 1.

FIG. 3 is a vertical section through one of the vacuum cups 18. The vacuum cups 18 are identical and each is formed with a cylindrical neck portion 60 and an outwardly and forwardly flared cup portion 62 formed at the outer end of the neck portion 60. The cylindrical neck portion 60 is formed with a recess 64 which communicates at one end with the interior of the cup portion 62 and terminates at its opposite end in a radially inwardly projecting flange or shoulder 66 having an opening 68 communicating the recess 64 with the rear end 70 of the cup 18. The cup portion 62 of the cups 18 are formed with convexly curved inner and outer walls 72 and 74 which taper from a relatively thick juncture 76 with the neck portion 60 to meet at the periphery 78 of the cup portion 62. The cups 18 are formed of resilient material, such as silicone rubber, and are secured to the manifold 16 by suitable bolts 80 which are formed of rigid material and have a head portion 82 and an externally threaded shank 84. The head engages the shoulder 66 of an associated vacuum cup 18, while the shank 84 projects through the opening 68 of the vacuum cup 18 and mates with a respective threaded opening 83 in the manifold 16. A passageway 72 extends axially through the bolt 80 and communicates the interior of the cup portion 62 of the vacuum cup 18 with the interior of the manifold 16. The passageway 72 is dimensioned to permit evacuation of air therethrough from the interior of the cup portion 62 of the vacuum cup 18, when the vacuum cup 18 is in engagement with a carton or the like, and to serve as a choke to restrict air passage therethrough when the vacuum cup 18 is not engaging a carton or the like. This limits the maximum volume of air which must be accommodated by the vacuum pump 40 and assures that if any one of the vacuum cups 18 is in engagement with a carton, sufficient vacuum will be produced to enable that vacuum cup 18 to retain and support the carton. If desired, suitable valve means may be mounted in the passageways 72 to regulate air flow therethrough. Such valve means may be electrically controlled or may be actuable by mechanical engagement with a carton or the like, as will be apparent to those skilled in the art.

Controls for the motors 15, 32, 56 and pump 40 may be housed in a control console 86 located adjacent the article handling device 2, as seen in FIG. 1. Alternatively, the control console 86 may be located at a central control area remote from the article handling device 2 or the article handling device 2 may be controlled by a computer or the like.

In use, a pallet 10 containing several tiers of cartons 8 is delivered by the first conveyor 6 onto the platform 4 and motor 15 is actuated to cause the jack 12 to raise the platform 4 until the cartons 8 engage the vacuum cups 18 and raise the manifold 16 within frame 20. This assures that the vacuum cups 18 have good contact with the cartons 8. The vacuum pump 40 pumps air from the carton-engaging surfaces of the vacuum cups 18 through the passageways 72 of the bolts 80, manifold 16 and hose 42 to cause the vacuum cups 18 to grip the top tier of the cartons 8. Platform 4 is then lowered, leaving the top tier of the cartons 8 suspended by the vacuum cups 18 beneath manifold 16, as seen at 8 in FIG. 1. Transmission 29 is engaged to adjust the vertical position of frame 20 and manifold 16 as necessary to prevent interference with the shuttle 48. Next, motor 56 is actuated to extend the shuttle 48 to underlie the cartons which are suspended by the vacuum cups 18 and, if desired, transmission 30 may be actuated to lower frame 20 so as to gently deposit the cartons 8 on the shuttle 48. The vacuum pump 40 is then actuated to allow air to destroy the vacuum within the vacuum cups 18 and, thereby, release the cartons 8; whereupon, transmission 30 is actuated to raise frame 20 and motor 56 is actuated to retract the shuttle 48 and to allow the cartons 8 to be transferred from the shuttle 48 to the second conveyor 44. This sequence of operations may be repeated until all or a desired number of tiers of the cartons 8 has been removed from the pallet 10. Alternatively, it will be apparent that, by reversing the sequence, the cartons 8 may be unloaded from the second conveyor 44 and deposited on the pallet 10.

Obviously, numerous variations and modifications can be made without departing from the present invention, Accordingly, it should be clearly understood that the form of the present invention described above and shown in the accompanying drawings is illustrative only and is not intended to limit the scope of the present invention.

What is claimed is:

1. An article transferring device comprising:
  a first conveyor,
  a platform positioned to permit transfer of articles between said platform and said first conveyor,
  a vacuum manifold mounted above said platform,
  a plurality of vacuum cups depending from said manifold and each having a bore communicating the gripping surface of the respective vacuum cup with said manifold,
  elevating means for raising and lowering said platform into and out of a position to cause articles carried by said platform to engage at least one of said vacuum cups,
  a shuttle extendable to a position underlying said vacuum cups and retractable to a position removed from said vacuum cups, a second conveyor positioned to permit transfer of articles between said shuttle and said second conveyor, each of said vacuum cups comprises:

an elongated generally cylindrical neck portion allowing vertical and rotational flexibility to guarantee proper engagement with varying carton surfaces and having an outwardly and forwardly flared cup portion formed at the outer end of said neck portion, a recess extending axially through said neck portion communicating at one end with the article engaging surface of said cup portion and terminating adjacent the other end in a radially inwardly projecting flange having an opening therethrough communicating the rear end of said vacuum cup with said recess, a bolt having a radially projecting head portion dimensioned to be slidably received within said recess of said neck portion and an externally threaded shank projecting from said head portion extendable through said opening, and a passageway extending axially completely through said bolt and dimensioned to permit air to be drawn therethrough to create a vacuum within said recess when said cup portion is in engagement with an article and to restrict the flow of air therethrough when said cup portion is not in engagement with an article.

2. An article transferring device comprising:

a first generally horizontally disposed conveyor along which articles are conveyed in respect to a transfer site, the first conveyor comprising an end at the transfer site;

a vertically displaceable platfrom positionable immediately horizontally adjacent said transfer site end of the first conveyor to permit horizontal transfer of articles between said conveyor and said platform;

vacuum manifold means mounted directly above said platform at the transfer site;

means selectively varying the vertical location of the manifold means;

an array of vertically oriented vacuum cups depending downwardly from said manifold at said transfer site, each vacuum cup having a bore communicating the gripping surface of each vacuum cup with the interior of said manifold to suspend articles being transferred in the air solely by vacuum;

means for (a) creating a vacuum in the manifold and the cups for suspending articles being transferred in the air solely by vacuum counter to gravity and (b) breaking the vacuum for releasing said articles being transferred;

means for selectively raising and lowering said platform into and out of a position to cause at least one article carried by said platform to engage at least one of said vacuum cups, and into and out of said position horizontally adjacent the first conveyor at the transfer site;

a second generally horizontally disposed conveyor one end of which is horizontally juxtaposed the transfer site;

a shuttle extension to the second conveyor, said shuttle extension being horizontally displaceable between a vacuum cup article transferring position directly vertically below the array of vacuum cups to transfer articles between the vacuum cup suspended position and the shuttle and a second conveyor transferring position horizontally adjacent the transfer site end of the second conveyor and out of vertical alignment with the vacuum cups to transfer articles horizontally between the shuttle extension and the transfer site end of the second conveyor.

* * * * *